United States Patent
Noland et al.

(10) Patent No.: US 11,349,951 B1
(45) Date of Patent: May 31, 2022

(54) MEDIA DEVICE CHECK-OUT/CHECK-IN CONTROL

(71) Applicant: Securus Technologies, Inc., Carrollton, TX (US)

(72) Inventors: Alexander Noland, North Richland Hills, TX (US); Connor Pickens, Little Elm, TX (US)

(73) Assignee: Securus Technologies, LLC, Carrollton, TX (US)

( * ) Notice: Subject to any disclaimer, the term of this patent is extended or adjusted under 35 U.S.C. 154(b) by 93 days.

(21) Appl. No.: 15/625,045

(22) Filed: Jun. 16, 2017

(51) Int. Cl.
*H04L 67/143* (2022.01)
*H04L 67/306* (2022.01)
*H04L 67/50* (2022.01)
*H04L 67/75* (2022.01)

(52) U.S. Cl.
CPC .......... *H04L 67/306* (2013.01); *H04L 67/143* (2013.01); *H04L 67/22* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 7,996,514 B2 * | 8/2011 | Baumert | G06F 21/35 709/203 |
| 2004/0142744 A1 | 7/2004 | Atkinson et al. | |
| 2005/0015612 A1 * | 1/2005 | You | G06F 21/34 726/26 |
| 2005/0102407 A1 * | 5/2005 | Clapper | H04W 24/00 709/228 |
| 2006/0095385 A1 * | 5/2006 | Atkinson | H04L 63/10 705/64 |
| 2010/0082485 A1 * | 4/2010 | Lin | G06Q 30/0603 705/44 |
| 2014/0272894 A1 * | 9/2014 | Grimes | G09B 5/08 434/350 |
| 2014/0273929 A1 * | 9/2014 | Torgersrud | H04M 15/886 455/406 |
| 2015/0077221 A1 * | 3/2015 | Peters | G07F 17/00 340/5.28 |
| 2016/0330078 A1 * | 11/2016 | Bostick | H04W 12/08 |
| 2018/0144301 A1 * | 5/2018 | Engel | G06Q 20/00 |

* cited by examiner

*Primary Examiner* — James A Edwards
(74) *Attorney, Agent, or Firm* — Fogarty LLP

(57) ABSTRACT

Systems and methods for controlling access to one or more media devices that may be shared among multiple users, such as multiple residents in a controlled-environment facility, are described herein. In some embodiments, a method includes operating at least one computer system. Operating the at least one computer system includes checking out a media device. Checking out the media device comprises enabling the media device for use for a first duration of a first timer. Operating the at least one computer system further includes, upon expiration of the first duration of the first timer, disabling use of the media device, and checking in the media device. The media device is prohibited from being checked out for a second duration of a second timer.

20 Claims, 3 Drawing Sheets

MEDIA DEVICE CHECK-OUT/CHECK-IN CONTROL

BACKGROUND

Correctional departments responsible for incarcerating inmates continue to develop methods and activities to rehabilitate the inmates for their subsequent release back into society. One aspect thought to aid in that transition is communication. By allowing prisoners to have some contact with friends and family while incarcerated, the justice system aims to facilitate their transition back into society upon release. Traditional forms of contact include telephone calls, in-person visitation, video visitation, etc. More recently, technological advances have allowed jails and prisons to provide other types of visitation, including individual-to-individual videoconferences and online chat sessions.

Other activities include educational and worker programs. The justice system can allow for inmates to access educational and worker programs so inmates can gain skills to prepare the inmates for career opportunities upon release. With these skills, the inmates may more easily access jobs, which can reduce the likelihood that the inmates will commit further criminal activity and become incarcerated again.

SUMMARY

Embodiments disclosed herein can provide for systems and methods for controlling access to one or more media devices that may be shared among multiple users, such as multiple residents in a controlled-environment facility. Generally, systems and methods disclosed herein allow for a media device to be checked out and checked in by a user. Various timers can be used to control the duration of the use of a checked-out media device and to provide a duration in which a checked-in media device cannot be checked back out. This can prevent a user from dominating possession and use of a media device, while also allowing other users better opportunities to access and use the media device. Other advantages of embodiments may also be achieved.

In accordance with some embodiments, a method includes operating at least one computer system. Operating the at least one computer system includes checking out a media device. Checking out the media device comprises enabling the media device for use for a first duration of a first timer. Operating the at least one computer system further includes, upon expiration of the first duration of the first timer, disabling use of the media device, and checking in the media device. The media device is prohibited from being checked out for a second duration of a second timer.

In accordance with some other embodiments, a method includes operating at least one computer system. Operating the at least one computer system includes checking out a shared media device by a first user. Checking out the shared media device comprises logging into the shared media device using a first account of the first user, and beginning a first timer with a first duration in which use of the shared media device is enabled for the first account of the first user. Operating the at least one computer system further includes, upon expiration of the first duration of the first timer, disabling use of the shared media device for the first account of the first user, and checking in the shared media device. Checking in the shared media device comprises beginning a second timer with a second duration during which the shared media device is prohibited from being checked out using the first account of the first user.

In accordance with some further embodiments, a system includes a computer system comprising at least one processor and a memory coupled to the at least one processor. The memory stores program instructions executable by the at least one processor to cause the computer system to perform tasks. The tasks include enabling a shared media device to be checked out using a first account of a first user; enabling the shared media device for use upon the shared media device being checked out using the first account of the first user; and initiating a first timer with a first duration during which the shared media device is enabled upon the shared media device being checked out using the first account of the first user. The shared media device becomes disabled for use by the first account of the first user upon expiration of the first duration of the first timer. The tasks further include enabling the shared media device to be checked in, and initiating a second timer with a second duration upon the shared media device being checked in. The shared media device is not available to be checked out using the first account of the first user during the second duration of the second timer.

The foregoing has outlined rather broadly some features and technical advantages of some embodiments disclosed herein in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The features of some embodiments, together with some objects and advantages will be better understood from the following description when considered in connection with the accompanying figures. It is to be expressly understood, however, that each of the figures is provided for illustration and description only and is not intended as a definition of the limits of the present invention.

BRIEF DESCRIPTION OF THE DRAWINGS

Reference will now be made to the accompanying drawings, wherein.

Figure 1:
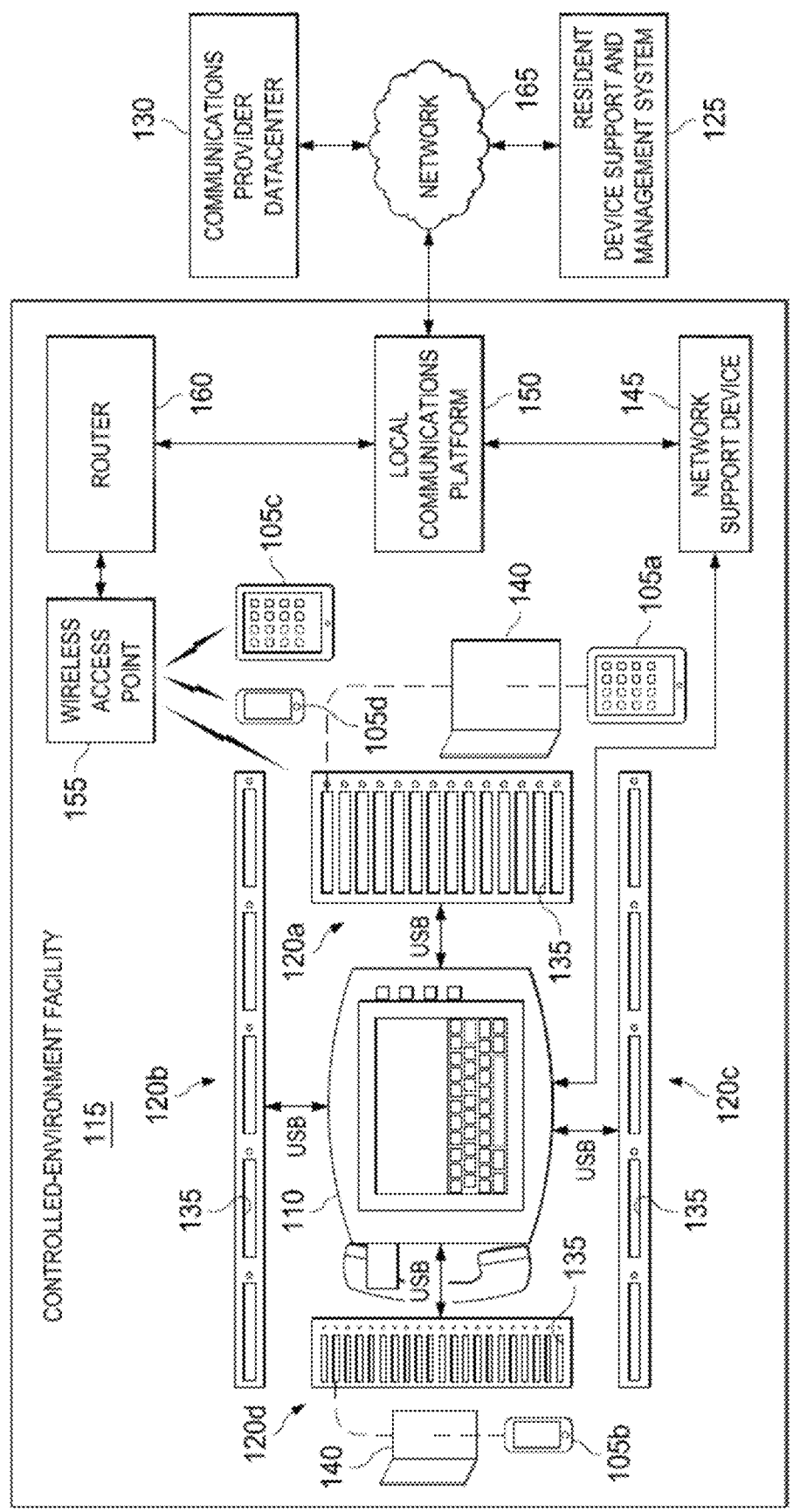
FIG. 1 is a diagrammatic illustration of an example shared media device control environment according to some embodiments.

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings.

Embodiments may take many different forms, and this disclosure should not be construed as limited to the embodiments set forth herein. Rather, these embodiments are provided so that this disclosure will be thorough and complete, and will fully convey the scope of the invention to those skilled in the art. One skilled in the art may be able to use the various embodiments.

This specification discloses systems and methods for checking out and checking in media devices, such as tablets, etc., that are shared among multiple users, and that may be implemented in a controlled-environment facility or another context. Generally, in systems and methods described herein, a resident of a controlled-environment facility may check out a media device for personal use, such as to view downloadable or streaming media content, communicate with another person, or other activities. A timer may be implemented with that resident's use of the media device, and when a duration of that timer has expired, the media device can be "locked up" or rendered unusable by that resident, at least until some later time. The resident can check the media device back in at which point another timer can be implemented relating to how long the media device remains checked in and/or to how long that resident waits until being able to check that media device or another media device back out. A person having ordinary skill in the art will readily understand other aspects and/or modifications.

Various types of controlled-environment facilities are present today, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, assisted living quarters, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory, and its students, etc.).

FIG. 1 is a diagrammatic illustration of an example shared media device control environment in accordance with an embodiment. The shared media device control environment illustrated in FIG. 1 permits for controlling, e.g., access to and/or durations of access to mobile media devices shared among multiple persons, such as multiple residents of a controlled-environment facility. Other embodiments may be applied in other environments and contexts.

FIG. 1 illustrates a controlled-environment facility 115, in which any number of residents may reside. Resident media devices 105 (e.g., 105a, 105b, 105c, 105d) are in the controlled-environment facility 115. The resident media devices 105 may be computer systems such as tablet computing devices, smartphones, media players, or the like. Resident media devices may be referred to as Intelligent Resident Devices (IRDs), Intelligent Inmate Devices (IIDs) (in correctional facility environments), and/or the like. In some examples, each resident media device 105 may be adapted for use in the corresponding controlled-environment facility. For example, in a correctional facility like a jail or prison, a resident media device 105 may be "stripped-down" from the standpoint of what applications programs (apps) are provided or allowed on the resident media device 105. By way of example, a resident media device may employ an operating system kernel based upon an open source platform such as the CyanogenMod ANDROID™-based operating system, which may be rebuilt for use in, for example, a tablet computing device. Further, for example, the resident media device may be adapted to only connect to a network provided by the correctional facility, and/or in only certain locations within the correctional facility, such as may be controlled by Wi-Fi access or the like being available only in certain areas. Also, the resident media device may have a few, fixed apps pre-installed on the device, and installation of further apps on the device may be forbidden (e.g., prevented by modifications to the device's operating system or the like) and/or restricted (e.g., by requiring permission from a facility administrator or the like). Apps provided on resident media device 105 might include apps of interest to residents of the controlled-environment facility. For example, a resident media device provided to inmates of correctional facilities might include apps that may be of interest to an inmate, such as access to a legal research service, employment searching apps, educational apps, entertainment apps, and/or the like. Also, resident media devices may be used to communicate with others, such as through phone calls, video calls, emails, instant messaging, and/or the like.

In some examples, one or more of the resident media devices 105 are disposed in respective housings 140, such as a (hinged) clamshell case, a cartridge, and/or the like. As described further below, a housing 140 can provide physical protection to a respective resident media device 105 and/or can provide a buffer coupling between a port of the respective resident media device 105 and another port to which the resident media device 105 and/or housing 140 may be coupled to charge the power of the resident media device 105 and/or to communicate with the resident media device 105.

An access station 110 is in the controlled-environment facility 115. The access station 110 may be or include a computer system or the like, and may further include video and/or telephone capabilities. For example, the access station 110 may include a personal computer, a laptop computer, a tablet computing device, a video phone computer system, and/or the like. The access station 110 may be referred to as an Intelligent Facility Device (IFD). Even further, in some examples, the access station 110 may be integrated into a kiosk or the like. Also, the access station 110 can be employed in a manner similar to a resident media device, which may provide a media solution for residents, as well as providing communications services, and/or the like.

At least one docking/charging station 120 (e.g., 120a, 120b, 120c, 120d) is operatively coupled to the access station 110. As illustrated, the docking/charging stations 120 may each comprise one or more docking/charging slots 135, where each docking/charging slot 135 is adapted to receive one resident media device 105. (Each docking/charging slot is generally identified in FIG. 1 as "135.") As illustrated in FIG. 1, the access station 110 may have docking/charging slots 135 deployed around the access station 110, or in other examples, in other configurations. The docking/charging slots 135 are connected, such as via a proprietary interface, USB, Ethernet, etc., and/or wireless connectivity (e.g., Wi- Fi, inductive connectivity, near field communications, Bluetooth, etc.), to the access station 110. Such connectivity may provide two-way communication between each resident media device 105 and the access station 110 via the respective docking/charging slots 135. In some examples, the docking/charging slots 135 may provide power to charge the resident media devices 105.

Each docking/charging slot 135 may have a port that mates with a corresponding port of an inserted resident media device 105 and/or a housing 140 to operatively connect the resident media device 105 with the access station 110 for charging, updating, and/or exchanging data with the resident media device. In some examples, plugging a cable into and out of a port of a resident media device 105 may be reduced by using housing 140. For example, the housing 140 may have a port (e.g., an interior, male port) that connects to a port (e.g., a female port) of a resident media device 105. The port of the housing 140 may be physically connected to (e.g., inserted into) the port of the resident media device 105 once and/or each time the resident media device 105 is removed from and placed back in the housing 140. The housing 140 can in turn have another port (e.g., an exterior, female port) that can be plugged into a port (e.g., a male port) of a docking/charging slot 135. Hence, the housing 140 can act as a coupling buffer for the resident media device 105, and wear and tear of the resident media device 105 that might be caused by repeated plugging and unplugging a port of the resident media device 105 into and from another port can be reduced. The various ports may be proprietary, universal (e.g., a USB port), and/or any other configuration. Thus, housing 140 may be removably disposed at least partially around or about at least a portion of the resident media device 105, and a charging and/or data exchange structure or mechanism(s) such as one or more ports (e.g., a USB port, power port, Input/Output (I/O) port, data port, etc.) defined by the housing 140 mates with at least one corresponding charging and/or data exchange port (e.g., a USB port, power port, I/O port, data port, etc.) of the resident media device 105. In some examples, the housing 140 can be omitted, and at least one charging and/or data exchange port (e.g., a USB port, power port, I/O port, data port, etc.) of the resident media device 105 can be directly plugged into and unplugged from a at least one corresponding charging and/or data exchange port (e.g., a USB port, power port, I/O port, data port, etc.) of a docking/charging slot 135.

The access station 110 is communicatively coupled to one or more Network Support Device(s) (NSD(s)) 145, which may include a switch, router, or other computer system. NSD 145 may provide an interface for querying docking/charging station(s) 120 and/or resident media devices 105 coupled thereto (e.g., disposed in docking/charging slots 135). For example, such an interface provided by or through NSD 145 may be used by facility personnel, or the like, to "blink" a resident media device status light, such as on the device itself or docking/charging slot 135 housing the device, to identify the particular resident media device. Additionally or alternatively, NSD 145 may be used to locate a particular resident media device by querying the resident media device's Global Positioning System (GPS) functionality. NSD 145 may maintain and employ image files, or the like to update, repair, reset or maintain a resident media device, or perform similar functions. In some such embodiments, application programs (apps) may be employed by facility personnel or the like to perform maintenance monitoring or security functions with respect to the connected resident media devices. For example, a voice driven app may be used to identify a particular resident media device disposed in the slots, provide facility personnel with information about missing resident media devices, which resident media devices need to be collected for charging, updating, etc.

The NSD 145 is further communicatively coupled to a local communications platform 150, which may therefore be operatively coupled to access station 110 and/or at least one resident media device 105. The local communications platform 150 may be implemented on a network appliance, such as a server or other computer system. Local communications platform 150 may be used to schedule and otherwise facilitate video visitation with the access station 110 and/or resident media device 105, administration of media to resident media devices 105, and/or the like.

In FIG. 1, resident media devices 105 are wirelessly communicatively coupled to a wireless access point 155, which is in turn communicatively coupled to router 160. The router 160 is communicatively coupled to the local communications platform 150. Local communications platform 150 is, in turn, shown as linked, such as through network connectivity, to NSD 145, and therethrough to access station 110 (and resident media devices 105 in docking/charging slots 135 of docking/charging stations 120). Outward facing connectivity, such as to a resident device support and management system 125 and/or communications provider datacenter 130 may be provided via a private or public network 165 (e.g., the Internet).

The resident device support and management system 125 is operatively coupled to access station 110, for example, through the local communications platform 150 and the NSD 145. Additionally (or alternatively), datacenter 130 may be operatively coupled to the access station 110, for example, through the local communications platform 150 and the NSD 145. Updates and/or data to be provided to resident media devices 105 may be provided from resident device support and management system 125 and/or datacenter 130, via access station 110 and/or via the wireless access point 155. The resident device support and management system 125 may be or include one or more computer systems, such as servers, and may further include one or more databases. Similarly, the datacenter 130 may be or include on one or more computer systems, such as servers.

Various modifications may be made to the system illustrated in FIG. 1. For example, various devices and/or functionality described herein may be local to or remote from the controlled-environment facility 115. Further, functionality can be distributed across multiple devices in various locations. Additionally, connections between devices may be in different configurations, and networks may be implemented to communicatively couple various devices in many different configurations.

In other examples, the docking/charging stations 120 may be omitted. For example, one or more charging tables may be configured to charge the resident media devices 105 when the resident media devices 105 are near the charging table(s). Further, communications between the access station 110 and the resident media devices 105 may be by Wi-Fi, near field communications, Bluetooth, and/or the like. Other modifications may be implemented.

In examples described herein, the resident device support and management system 125 implements various timers with respect to each resident media device 105 and/or each resident to control access to the resident media devices 105. In other examples, one or more of the access station 110, resident media devices 105, and/or resident device support and management system 125 can implement the timers. A resident may be permitted to check out a resident media device 105, which initiates a timer for that resident to use the checked-out resident media device 105. When the timer expires, the checked-out resident media device 105 may become disabled and/or have limited functionality until the checked-out resident media device 105 is checked back in using the access station 110, in this example. Another timer may then be implemented with respect to the returned resident media device 105, which can prevent the resident and/or another resident from checking out the returned resident media device 105 during the duration of that timer, and/or with respect to the resident, which can prohibit the resident from checking out any one of the resident media devices 105 during the duration of that timer. The functionality relating to the timers can be implemented across one or more devices in FIG. 1, for example.

In the example shown in FIG. 1, the access station 110 is operable to detect when any of the resident media devices 105 are disposed in the docking/charging slots 135 of the docking/charging stations 120. For example, when a resident media device 105, and/or corresponding housing 140, has a port plugged into a port of a respective docking/charging slot 135, communications between the resident media device 105 and the access station 110 can include a communication from the resident media device 105 to the access station 110 with a unique identifier of the resident media device 105, such as a Media Access Control (MAC) address, an identifier programmed in the resident media device 105, and/or other identifiers. In the illustrated example, the communication can be through the docking/charging station 120 to which the resident media device 105 is connected. In other examples, the communication may be by wireless communication, such as near field communication, Bluetooth, Wi-Fi, and/or the like.

When the access station 110 detects that the resident media devices 105 are, for example, disposed in the docking/charging slots 135, the access station 110 determines that the respective resident media devices 105 are checked in. The access station 110 communicates, e.g., via the NSD 145, local communications platform 150, and network 165, to the resident device support and management system 125 that the respective resident media devices 105 are checked in. The resident device support and management system 125 maintains a list and/or database of checked in resident media devices 105.

A resident may be permitted to check out a resident media device 105 that is available for checking out. The resident(s) may have authority to check out independently, or check-out may require facility personnel to authorize check-out, for example. In some examples, the resident may request to check out a resident media device 105 using the access station 110. The resident may log into the access station 110 using an account maintained at the resident device support and management system 125, for example, and through that log-in request to check out a resident media device 105. The resident device support and management system 125 then determines whether any resident media device 105 is available for checking out and/or whether the resident is permitted to check out any resident media device 105. If a resident media device 105 is available for check out, the resident device support and management system 125 can communicate back to the access station 110 which resident media device 105 is available, and the access station 110 can indicate to the resident which resident media device 105 is available, such as by indicating on a screen of the access station 110 a slot number of the corresponding docking/charging slot 135 into which the available resident media device 105 is plugged, by blinking a light of the corresponding docking/charging slot 135, and/or another indication.

The resident can log into an available resident media device 105, via wireless access through the wireless access point 155, using an account maintained at the resident device support and management system 125, which checks out that resident media device 105 to the resident and initiates a first timer. The resident device support and management system 125 can maintain, e.g., a database storing information relating to the check-out of the resident media device 105 with respect to the account of the resident. Further, the resident device support and management system 125 may implement and begin the first timer upon the resident logging in. If a resident attempts to log into a resident media device 105 that is not available for check out, the resident device support and management system 125 may prohibit the log in, and/or the resident media device 105 may remain disabled.

In other examples to determine if a resident media device 105 is available for check out, a resident may take a resident media device 105, e.g., from a corresponding docking/charging slot 135, and may attempt to log into the resident media device 105 using an account maintained at the resident device support and management system 125 via wireless access through the wireless access point 155. If the resident media device 105 is available for checking out, the act of logging into the resident media device 105 may act to check out the resident media device 105 and initiates the first timer. If the resident media device 105 is not available for checking out, the resident device support and management system 125 can prohibit the resident from logging into the resident media device 105, and/or the resident media device 105 may remain disabled.

In further examples, the access station 110 may be, or may include, a scanner, such as a bar code scanner, near field communication scanner, radio frequency identification (RFID) scanner, Bluetooth scanner, or other scanner. A resident may check out a media device by scanning the resident media device 105 and/or housing 140 with the scanner at the access station 110. When the scanner scans the resident media device 105 and/or housing 140, the access station 110 notifies the resident device support and management system 125 that the resident checked out the resident media device 105. The act of scanning the resident media device 105 may act to check out the resident media device 105 and initiates the first timer.

In some examples, the resident device support and management system 125 maintains the first timer such that the log-in of the user is permitted to be valid throughout the duration of the first timer. In these examples, the resident device support and management system 125 can communicate to the checked-out resident media device 105 when the timer has expired and force a log-out from the resident media device 105, to thereby disable use of the resident media device 105. In other examples, the resident device support and management system 125 can communicate to the resident media device 105, e.g., via the wireless access point 155, a duration for the first timer during which operation of the resident media device 105 is enabled. The first timer can be part of an application implemented on the resident media device 105, part of the operating system of the resident media device 105, and/or implemented other ways. When the duration of the first timer expires, the resident media device 105 can disable itself from use. The first timer may be implemented in different ways, and redundancy may be built in by implementing a first timer on both the resident device support and management system 125 and the resident media device 105.

The duration of the first timer may be associated with a particular user log-in, e.g., associated with the resident that checked out the resident media device 105. The timer may begin, for example, upon the resident media device 105 becoming unplugged from its corresponding docking/charging slot 135, upon the resident logging into the resident media device 105 using an account maintained at the resident device support and management system 125 via wireless access through the wireless access point 155, and/or other mechanisms. The duration of the first timer may be the same or different for various residents residing in the controlled-environment facility 115.

Once the first timer begins, the resident can use the resident media device 105 to, e.g., stream and/or download media, such as videos, games, etc., communicate with others, such as through email, videoconferencing, telephone, etc., and/or other activities. For example, the resident can access media from the datacenter 130 via the network 165, the local communications platform 150, the router 160, and the wireless access point 155. When the duration of the first timer expires, the resident media device 105 will be disabled from the resident continuing use. For example, a forced log-off of the resident from the resident media device 105 may occur as a result of a communication from the resident device support and management system 125 in response to the expiration of the first timer, and the resident device support and management system 125 may not permit any resident to log into the resident media device 105 until, for example, the resident media device 105 is checked back in. In other examples, the resident media device 105 may disable itself upon expiration of the first timer.

The resident may check the resident media device 105 in at the access station 110, such as by inserting the resident media device 105 into a docking/charging slot 135. The access station 110 is operable to detect when and which of the resident media devices 105 is disposed in the docking/charging slot 135, as described above. When the access station 110 detects that the resident media device 105 is disposed in the docking/charging slot 135, the access station 110 determines that the respective resident media device 105 is checked in. The access station 110 communicates, e.g., via the NSD 145, local communications platform 150, and network 165, to the resident device support and management system 125 that the resident media device 105 is checked in. In other examples, the resident media device 105 can be checked in by scanning the resident media device 105 by a scanner of the access station 110.

Upon the resident media device 105 being checked back in, the resident device support and management system 125 begins a duration of one or more second timers. The second timer(s) can be associated with, e.g., the resident media device 105 that was checked in, the account of the resident that checked the resident media device 105 in, and/or another condition. For example, a second timer may prohibit any resident from checking out the resident media device 105 that was checked in until the expiration of the duration of the second timer. In another example, a second timer may prohibit the resident that checked the resident media device 105 in from checking any resident media device 105 out until the expiration of the duration of the timer. In a further example, a second timer may prohibit the resident that checked the resident media device 105 in from checking that resident media device 105 out until the expiration of the duration of the second timer. In that example, the resident may check out another resident media device 105, and any other resident may check out the resident media device 105 that was checked in by the resident. In other examples, multiple second timers may be implemented, such as one second timer with respect to the resident media device 105 that was checked in and another second timer with respect to the resident that checked in the resident media device 105. For example, one second timer may prohibit any resident from checking out the resident media device 105 that was checked in for some duration (e.g., 30 minutes), and another second timer may prohibit the resident that checked in the resident media device 105 from checking out any resident media device 105 for some other duration (e.g., 1 hour). The second timer(s) can be implemented by the resident device support and management system 125, in some examples, while in other examples, the second timer(s) can be implemented by one or more of the resident device support and management system 125, the resident media devices 105, and/or the access station 110, for example.

When the resident media device 105 is checked in and the duration of an appropriate second timer(s) has expired, the resident media device 105 may be available to check out by, e.g., the same resident that checked the resident media device 105 in and/or another resident, as described above. Until the duration of the appropriate second timer(s) has expired, the resident media device 105 may be prohibited from being checked out, and therefore may be unavailable for checking out.

Although not illustrated in FIG. 1, an administrator, via, e.g., a computer system in or remote from the controlled-environment facility 115, may log into the resident device support and management system 125 to identify which resident media devices 105 are checked out and to which account. Further, the administrator may be able to, via the resident device support and management system 125, remotely disable one or more resident media devices 105 and/or force a log-out from one or more resident media devices 105.

Further, if a resident fails to check-in a resident media device 105 after some predefined duration after expiration of the first timer (e.g., when the resident media device 105 is disabled), the resident device support and management system 125 can send an alert or notification to an administrator and/or authorized personnel to indicate that the resident media device 105 remains checked out. The resident device support and management system 125 can also send a location of the resident media device 105 to the administrator and/or authorized personnel, such as a GPS location, which may be enabled by a GPS position system within the resident media device 105.

Figure 2:
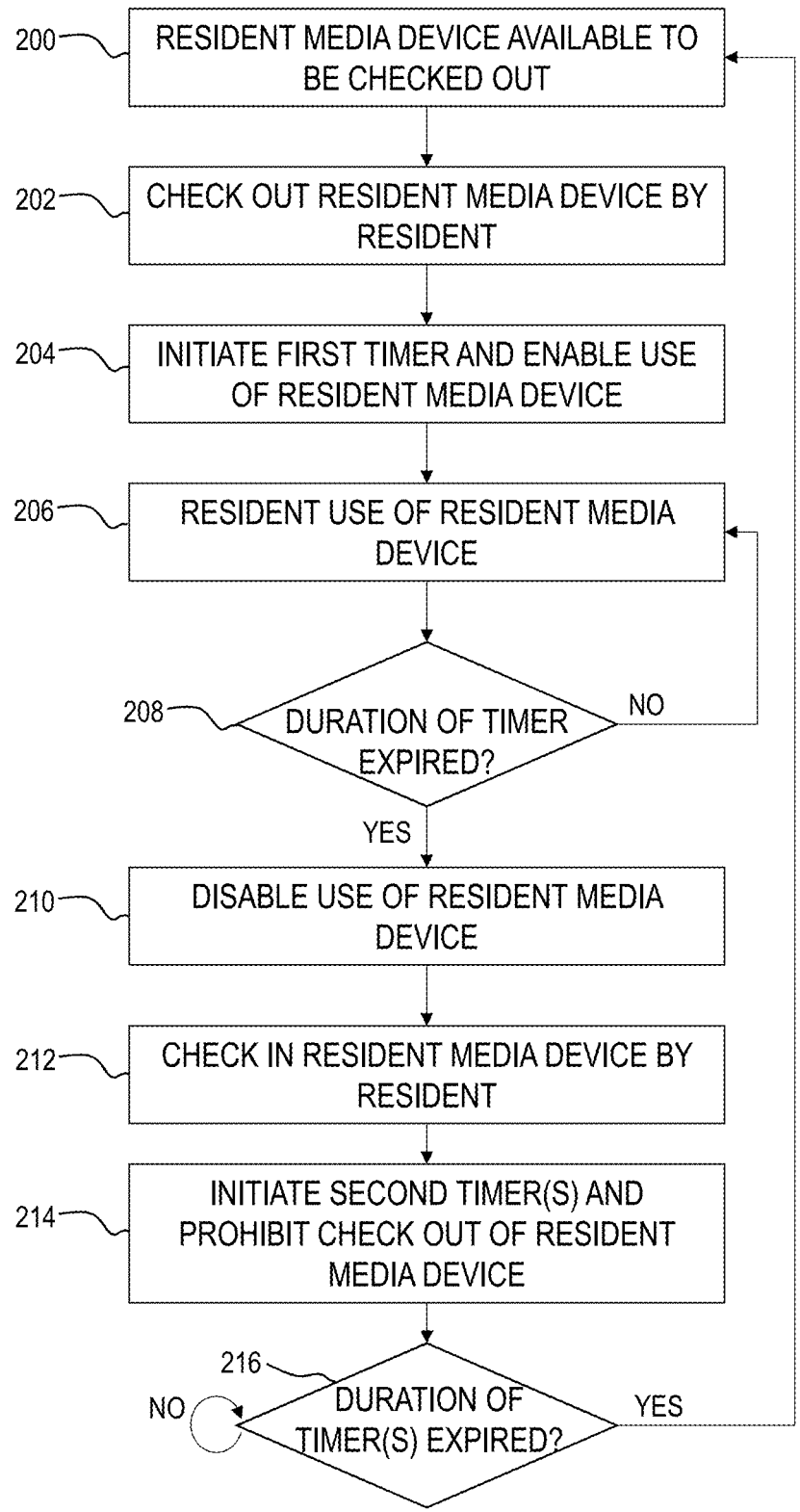
FIG. 2 is an example method for checking out and in a resident media device according to some embodiments.

FIG. 2 illustrates an example method for checking out and in a resident media device, which may be shared among residents in a controlled-environment facility, in accordance with some embodiments. Features may be added to and/or omitted from the illustrated method in other embodiments. Further, the method may be performed in any logical order.

A resident media device is available 200 to be checked out. For example, the resident media device may be plugged into a docking/charging slot with one or more timers that would otherwise prohibit the checking out of the resident media device being expired. A resident checks out 202 the resident media device. For example, the resident can request that the resident media device be checked out through an access station and/or by logging into the resident media device using an account maintained by a resident device support and management system. Upon check out, a first timer is initiated and use of the resident media device is enabled 204. For example, by logging in to the resident media device using the account, the log-in can be permitted by the resident device support and management system to enable use of the resident media device, and the first timer can be initiated by the resident device support and management system to establish a duration in which the log-in is enabled. The resident is permitted to use 206 the resident media device, which can include streaming and/or downloading content, such as music, videos, games, etc., communicating with others, such as by email, telephone, text message, video conferencing, etc., and/or other use.

While the resident media device is checked out and enabled for use, the duration of the first timer is reduced (e.g., counted down if the duration is some predefined duration like 30 minutes, 1 hour, etc., and/or by the elapsing of time until a predefined time and date is reached). If the duration of the first timer has not expired 208, the resident media device can remain checked out and enabled for use by the resident 206. Of course, the resident may decide to log out and check the resident media device back in before expiration of the duration of the first timer. If the duration of the first timer has expired 208, the resident media device is disabled 210 from use. For example, the resident device support and management system may force a logout of the resident from the resident media device, at which point no resident may be permitted to log in to the resident media device.

With the resident media device being disabled, the resident is encouraged to check the resident media device back in because use of the resident media device by any resident may be disabled until the resident media device is checked in. The resident checks in 212 the resident media device. The check-in can be by surrendering the resident media device to the access station by inserting the resident media device into a docking/charging slot to communicatively couple (e.g., plug in) the resident media device to a port of the docking/charging slot. By communicatively coupling the resident media device, the access station can detect the presence of the resident media device in the docking/charging slot, and communicate to the resident device support and management system that the resident media device is present in the slot. The resident device support and management system records that the resident media device is checked in in response to the communication from the access station.

One or more second timers are initiated and the resident media device is prohibited 214 from being checked out. Upon check-in, the resident device support and management system can initiate second timers associated with the resident media device, the account of the resident that checked the resident media device in, and/or other conditions, such as described above. If the duration of the second timer(s) has not expired 216, the resident media device will continue to be prohibited from being checked out. For example, during such time, the resident device support and management system can communicate to the access station which resident media devices, if any, are not available for check out to a requesting resident, which information can be displayed and/or indicated via the access station. If the duration of the second timer(s) has expired 216, the resident media device is available 200 to be checked out by a resident. Upon expiration of the second timer(s) the resident device support and management system can record that the resident media device is available for check out. For example, after expiration of the second timer(s), the resident device support and management system can communicate to the access station which resident media devices, if any, are available for check out to a requesting resident, which information can be displayed and/or indicated via the access station.

In some examples, by implementing a first timer that causes use of a checked-out resident media device to become disabled upon expiration of the first timer and by implementing a second timer when the resident media device is checked in that prohibits further check out until expiration of the second timer, residents may have more opportunities to check out a resident media device. For example, disabling use of a checked-out resident media device can discourage a single resident from retaining possession of the resident media device because that resident will be unable to continue using the resident media device. Further, by prohibiting a subsequent check out until expiration of a second timer, a resident can be prohibited from checking in a resident media device and immediately checking that same device back out, which could prevent another resident from having an opportunity to check out that resident media device.

Figure 3:
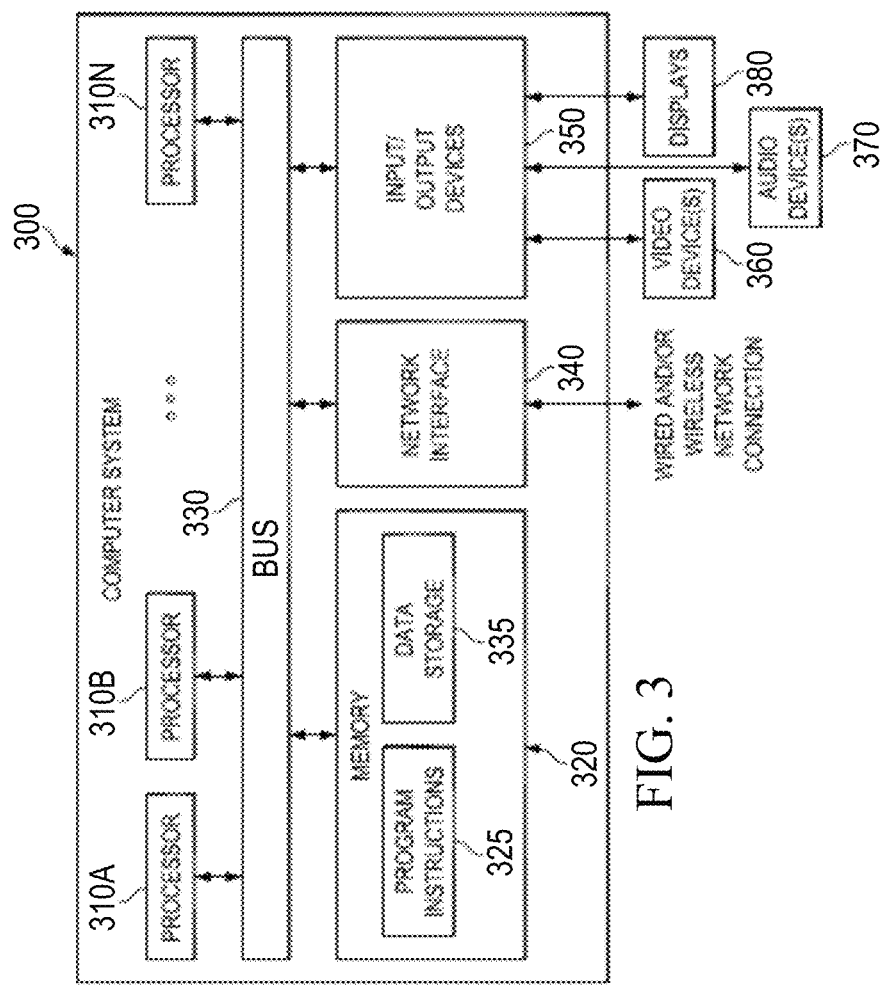
FIG. 3 is an example schematic of a computer system according to some embodiments.

Some embodiments of the present systems and methods for controlling access to a media device, which may be shared among multiple residents of a controlled-environment facility, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer system 300 may implement one or more steps of the example process described above with respect to FIG. 2, and/or a computer system such as computer system 300 may be used as, or as part of, one or more of resident media device 105, access station 110, resident device support and management system 125, datacenter 130, NSD 145, local communications platform 150, and/or the like. As noted, in various embodiments two or more of these computer systems may be configured to communicate with each other in any suitable way, such as, for example, via a network. For example, in FIG. 1, resident media devices 105 are illustrated as wirelessly communicating via wireless access point 155 and router 160, with local communications platform 150. Local communications platform 150 is, in turn, shown as linked, such as through network connectivity, to NSD 145, and therethrough to access station 110 (and resident media devices 105 in docking/charging slots 135 of docking/charging stations 120). Outward facing connectivity, such as to resident device support and management system 125 and/or datacenter 130 may be provided via a private or public network 165 (e.g., the Internet).

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements shown in FIG. 1, which may be configured to affect the operations discussed in FIGS. 1 and 2. Program instructions 325 may be implemented in various embodiments using any desired programming language, scripting language, or combination of programming languages and/or scripting languages (e.g., C, C++, C#, Java™ JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein, particularly in connection with FIG. 2, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems or devices illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
operating at least one computer system comprising:
checking out a media device available for check out; after taking of the media device by a first user, by enabling the media device for use, using a first account of the first user, for a first duration of a first timer;
upon expiration of the first duration of the first timer, disabling use of the media device;
upon return of the media device for check in, prohibiting the media device from being checked out, using the first account of the first user, for a second duration of a second timer; and
send an alert or notification to an administrator and/or authorized personnel to indicate that the media device remains checked out in in response to the first user failing to check in the media device after a predefined duration after expiration of the first timer.

2. The method of claim 1, wherein operating the at least one computer system further comprises providing a visual indication of one or more media devices that are available for taking for the check out.

3. The method of claim 1, wherein the check out of the media device further comprises logging into the media device using an account of a user.

4. The method of claim 1, wherein disabling use of the media device comprises forcing a log-out of the account of the user from the media device.

5. The method of claim 1, wherein disabling use of the media device comprises locking up the media device.

6. The method of claim 1, wherein the check in of the media device comprises receiving an indication that the media device was surrendered to an access station.

7. The method of claim 6, wherein the access station transmits the indication that the media device was surrendered to the access station in response to the access station detecting that the media device is communicatively coupled to the access station.

8. The method of claim 1, wherein the media device is not prohibited from being checked out using a second account of a second user for the second duration of the second timer.

9. The method of claim 1, wherein the media device is prohibited from being checked out using a second account of a second user for the second duration of the second timer.

10. A method, comprising:
operating at least one computer system comprising:
enabling a first user to:
log into an access station using a first account of the first user; and
request to check out a media device;
determining whether a media device is available for checking out and whether the first user is permitted to check out a media device;
communicating to the first user via the access station, in response to a media device being available and the first user being permitted to check out a media device, which shared media device of a plurality of media devices is available;
checking out the shared media device available for check out by taking of the shared media device by the first user, checking out the shared media device by the first user, checking out the shared media device comprising:
logging into the shared media device using the first account of the first user; and
beginning a first timer with a first duration in which use of the shared media device is enabled for the first account of the first user;
upon expiration of the first duration of the first timer, disabling use of the shared media device for the first account of the first user; and
upon return of the shared media device for check in, checking in the shared media device, wherein checking in the shared media device comprises beginning a second timer with a second duration during which the shared media device is prohibited from being taken for check out using the first account of the first user.

11. The method of claim 10, wherein operating the at least one computer system further comprises providing a visual indication of one or more shared media devices that are available for checking out.

12. The method of claim 10, wherein disabling use of the shared media device comprises forcing a log-out of the first account of the first user from the shared media device.

13. The method of claim 10, wherein disabling use of the shared media device comprises locking up the shared media device.

14. The method of claim 10, wherein the shared media device is not prohibited from being checked out using a second account of a second user during the second duration of the second timer.

15. The method of claim 10, wherein the shared media device is prohibited from being checked out using a second account of a second user during the second duration of the second timer.

16. A system, comprising:
a computer system comprising at least one processor and a memory coupled to the at least one processor, the memory storing program instructions executable by the at least one processor to cause the computer system to:
determine if a shared media device is available for check out, in response to a first user taking the shared media device and the first user attempting to log into the shared media device using a first account of the first user;
prohibit the first user from logging into the shared media device, in response to the shared media device not being available for check out, disabling the shared media device for use by the first account of the first user;
check out the shared media device using the first account of the first user, in response to the shared media device being available for check out; and:
enable the shared media device for use using the first account of the first user;
initiate a first timer with a first duration during which the shared media device is enabled upon the shared media device being checked out using the first account of the first user, wherein the shared media device becomes disabled for use by the first account of the first user upon expiration of the first duration of the first timer;
enable the shared media device to be returned for check in; and
initiate a second timer with a second duration upon the shared media device being checked in, wherein the shared media device is not available to be taken for check out using the first account of the first user during the second duration of the second timer.

17. The system of claim 16, wherein the shared media device is enabled to be checked out comprises enabling logging into the shared media device using the first account of the first user, and wherein the shared media device becomes disabled comprises a forced log-out of the first account of the first user from the shared media device.

18. The system of claim 16, wherein the shared media device is available to be checked out using a second account of a second user during the second duration of the second timer.

19. The system of claim 16, wherein the shared media device is not available to be checked out using a second account of a second user during the second duration of the second timer.

20. The method of claim 1, further comprising sending a location of the media device in the alert or notification to the administrator and/or authorized personnel based on location data enabled by the media device.

* * * * *